US012495235B2

(12) United States Patent
May

(10) Patent No.: US 12,495,235 B2
(45) Date of Patent: Dec. 9, 2025

(54) AUDIO ACCESSORY SYSTEMS AND METHODS

(71) Applicant: Randall May International Incorporated, Irvine, CA (US)

(72) Inventor: Randall L. May, Irvine, CA (US)

(73) Assignee: Randall May International Incorporated, Irvine, CA (US)

( * ) Notice: Subject to any disclaimer, the term of this patent is extended or adjusted under 35 U.S.C. 154(b) by 241 days.

(21) Appl. No.: 18/341,517

(22) Filed: Jun. 26, 2023

(65) Prior Publication Data

US 2023/0421939 A1 Dec. 28, 2023

Related U.S. Application Data

(60) Provisional application No. 63/355,915, filed on Jun. 27, 2022.

(51) Int. Cl.

| | |
|---|---|
| ***H04R 1/08*** | (2006.01) |
| ***F16M 13/02*** | (2006.01) |
| ***G10D 13/02*** | (2020.01) |
| ***G10D 13/10*** | (2020.01) |
| ***H04R 1/02*** | (2006.01) |

(52) U.S. Cl.

CPC ............. *H04R 1/08* (2013.01); *F16M 13/022* (2013.01); *G10D 13/02* (2013.01); *G10D 13/10* (2020.02); *H04R 1/02* (2013.01); *H04R 2420/09* (2013.01)

(58) Field of Classification Search

CPC ........ G10D 13/02; G10D 13/10; G10D 13/28; G10H 2220/211; G10H 3/146; H04R 1/08; H04R 1/02; H04R 1/46; H04R 1/083; H04R 2420/09; G10K 11/004

See application file for complete search history.

(56) References Cited

U.S. PATENT DOCUMENTS

| | | | |
|---|---|---|---|
| 4,168,646 | A | 9/1979 | May |
| 4,570,522 | A | 2/1986 | May |
| 6,121,528 | A | 9/2000 | May |
| 7,270,863 | B2 | 9/2007 | May |
| 8,063,297 | B2 | 11/2011 | May |
| 8,609,970 | B2 | 12/2013 | May |
| 10,015,571 | B2 | 7/2018 | May |
| 10,808,717 | B2 | 10/2020 | May |
| 10,945,057 | B2 | 3/2021 | May |

*Primary Examiner* — Kile O Blair

(74) *Attorney, Agent, or Firm* — Crowell & Moring LLP

(57) ABSTRACT

An audio accessory system includes a housing configured to hold a microphone cord that extends from a microphone internal to a drum to the housing through an air hole of the drum. The housing is coupled to a base mount such that an angular orientation α of the housing with respect to the base mount is adjustable via rotation about a common axis A. The base mount includes a support structure having at least one magnet configured to magnetically engage the drum so as to removably secure the base mount to the drum.

16 Claims, 9 Drawing Sheets

AUDIO ACCESSORY SYSTEMS AND METHODS

CROSS-REFERENCE TO RELATED APPLICATIONS

This application claims priority to Provisional Patent Application No. 63/355,915, filed on Jun. 27, 2022, the entire contents of which are hereby expressly incorporated by reference herein.

BACKGROUND OF THE INVENTION

The invention relates to improvements in audio accessory systems, particularly for percussion instruments, namely, acoustic drums.

It is known that the sound characteristics of acoustic drums is dependent on several construction factors, such as: shell material, density, dimensions, air hole diameter and location, and other such factors.

It is also known that microphones may be used with acoustic percussion instruments for the purpose of sound reinforcement and/or audio recording. In the case of acoustic drums and other such percussion instruments, the microphones are generally mounted near the resonant head and/or the batter head. In many cases, the microphone is mounted internally to the drum shell.

In such cases, it is known to utilize the air hole of the acoustic drum to connect the microphone to an exterior audio cord that carries audio signals from the microphone to a mixer or other applicable audio equipment. However, the existing hardware that allows for such connection is generally mounted to location of the air hole. This can interfere with other drum hardware, can require different size hardware to accommodate the various size vent holes, or can otherwise render the audio connection difficult to access by users, sound engineers, etc., in the event real-time troubleshooting is necessary (e.g., if the audio signal is intermittent or drops out).

It is an object the invention to provide an audio accessory system that overcomes these and other disadvantages that would be apparent to those of ordinary skill in the art.

Various additional objects, features, aspects, and advantages of the described invention will become apparent from the following detailed description, taken in conjunction with the accompanying drawings, which illustrate, by way of example, the principles of the described invention. It should be recognized that the one or more examples in the disclosure are non-limiting examples and that the present invention is intended to encompass variations and equivalents of these examples. The disclosure is written for those skilled in the art. Although the disclosure use terminology and acronyms that may not be familiar to the layperson, those skilled in the art will be familiar with the terminology and acronyms used herein.

BRIEF DESCRIPTION OF THE DRAWINGS

The features, objects, and advantages of the present invention will become more apparent from the detailed description, set forth below, when taken in conjunction with the drawings, in which like reference characters identify elements correspondingly throughout.

DETAILED DESCRIPTION OF THE PREFERRED EMBODIMENTS

Figure 1:
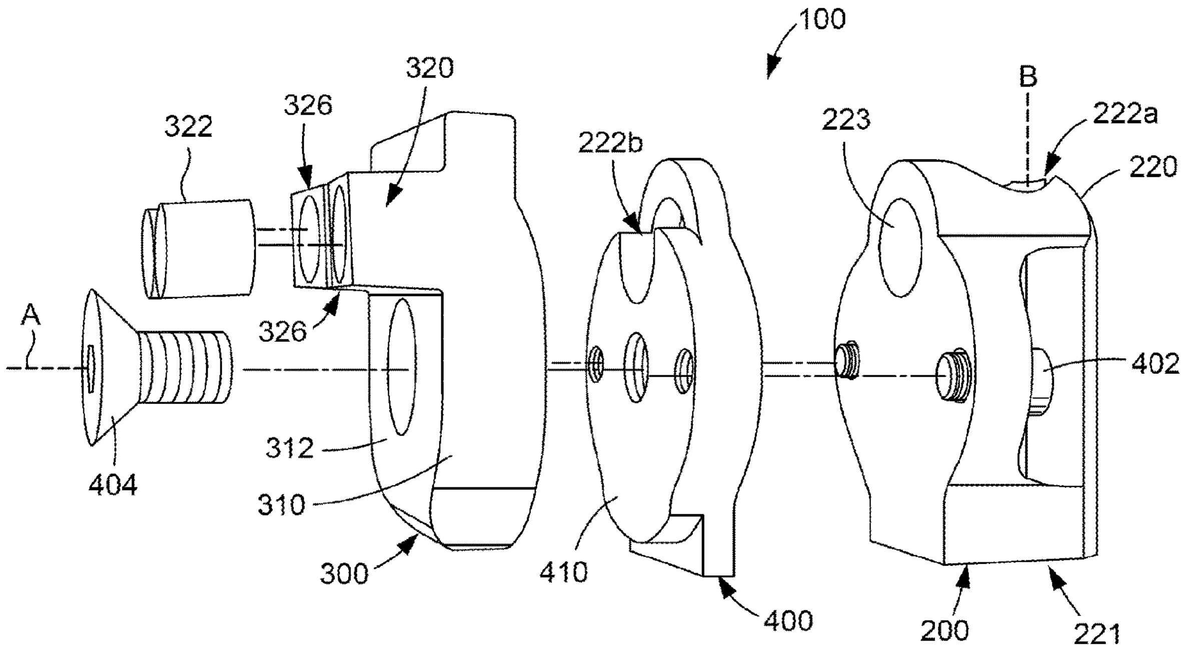
FIG. 1 is an exploded view of aspects of an exemplary audio accessory system in accordance with at least one embodiment.

The above described drawing figures illustrate the described invention in at least one embodiment, which is further defined in the following description. Those having ordinary skill in the art may be able to make alterations and modifications to what is described herein without departing from its spirit and scope. While the described invention is susceptible of embodiment in many different forms, there is shown in the drawings and will herein be described in detail at least one embodiment of the invention with the understanding that the present disclosure is to be considered as an exemplification of the principles of the invention and is not intended to limit the broad aspect of the invention to the embodiments illustrated. Therefore, it should be understood that what is illustrated is set forth only for the purposes of example and should not be taken as a limitation on the scope of the described invention.

FIGS. 1-8 illustrate an exemplary audio accessory system 100 in accordance with at least one embodiment. The audio accessory system 100 is designed for use with a microphone assembly 10 that includes a microphone 12 positioned internal to a drum 20 and a microphone cord 14 extending from the microphone 12 through an air hole 22 of the drum 20 to a connection head 16 (e.g., an XLR connection head). An exemplary microphone assembly 10 is shown, for example, in FIGS. 2 and 6-8.

As shown in FIGS. 1-2 and 6-9 in at least some embodiments, the audio accessory system 100 generally comprises: a housing 200 coupled to a base mount 300.

The housing 200 is configured to house the connection head 16 securely such that it is connectable to a corresponding audio connector (e.g., an XLR connector) cord that carries audio signals from the microphone 12 to a mixer or other applicable audio equipment. In some embodiments, the housing 200 is also configured to at least partially house the microphone cord 14. The housing 200 is coupled to the base mount 300 such that an angular orientation α of the housing 200 with respect to the base mount 300 is adjustable via rotation about a common axis A. The adjustment of the angular orientation α allows for the repositioning of the connection head 16 and the microphone cord 14. FIGS. 6-9 generally illustrate the angular orientation adjustment, in accordance with at least one embodiment.

In some embodiments, the housing 200 includes a port 220 having a port inlet 221 and at least one port outlet 222, wherein the port 220 extends along a port axis B through the housing 200 from the inlet to the outlet. The port 220 is preferably configured to hold the connection head 16 securely therein such that the connection head 16 is readily accessible for connecting to the corresponding connector. The connection head 16 is preferably held so as to be oriented normal to the common axis A.

The port inlet 221 is therefore also preferably oriented normal to the common axis A such that the angular orientation α of the housing 200 corresponds to the angular orientation α of the port inlet. In other words, the port inlet 221 is preferably coaxial with the port axis.

The at least one port outlet 222 is configured to permit the microphone cord 14 to exit the port 220.

In some embodiments, the at least one port outlet 222 includes an inline port outlet **222*a* oriented coaxial with the port axis. Accordingly, the port 220 guides the microphone cord 14 to exit out of the inline port outlet 222*a* substantially in line with the connection head 16**.

In some embodiments, the at least one port outlet 222 includes an offshoot outlet **222*b* positioned askew from the port axis. The offshoot outlet 222*b* is coupled to the port 220 via an offshoot 223 that extends from the port 220 through the housing 200 parallel to the common axis A. Accordingly, the offshoot 223 guides the microphone cord 14 to exit out of the offshoot outlet 222*b* substantially askew from the connection head 16**.

The base mount 300 is configured to magnetically engage the drum 20 so as to removably secure the accessory external to the drum 20. The base mount 300 therefore comprises or otherwise houses at least one magnet 322 configured to magnetically secure the base mount 300 to the drum 20. In particular, the at least one magnet 322 is configured to magnetically secure the base mount 300 to any portion of the drum 20 made of magnetic material, such as: a drum hoop of the drum 20, a tension rod of the drum 20, and/or a tension clamp of the drum 20. FIGS. 9A-9D illustrate the magnetic engagement in accordance with at least one embodiment.

As used herein, the term “magnetic material” means any material that is sufficiently magnetically attracted to the at least one magnet 322 for the base mount 300 to be magnetically secured to the portion of the drum 20 made of the magnetic material. Examples of magnetic material include ferromagnetic/ferrimagnetic materials such as: iron, nickel, cobalt and their alloys.

Figure 2:
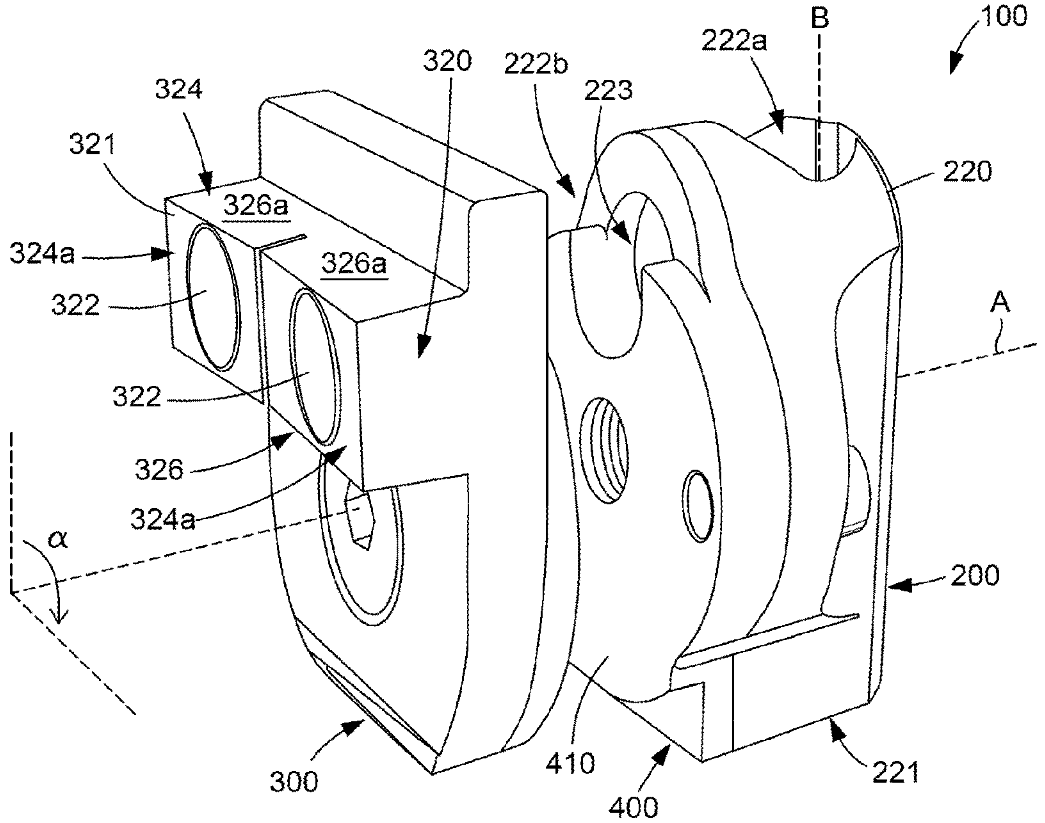
FIG. 2 is an exploded perspective view of aspects of the exemplary audio accessory system in accordance with at least one embodiment.

In some embodiments, the base mount 300 comprises a generally tab-shaped base mount body 310 having a proximal surface 312 that is substantially normal to the common axis A. As used herein, the term “tab-shaped” refers to a U-shaped prism, D-shaped prism, V-shaped prism, rectangular prism, trapezoidal prism, polygonal prism, or similar shaped prism, or juxtapositions thereof. For example, the base mount body 310 shown in FIGS. 1-2 is generally shaped as a U-shaped or prism juxtaposed with a cylindrical prism.

In some embodiments, the base mount 300 further includes a support structure 320 that comprises or otherwise houses the at least one magnet 322. The at least one magnet 322 is oriented in the direction of the common axis A from a magnet face 321 of the support structure 320. Thus, magnetic engagement with the drum 20 occurs via contacting the magnet face 321 to the drum 20, particularly to the portion of the drum 20 with which the magnetic engagement occurs. Accordingly, the magnetic engagement is substantially in the direction of the common axis A.

In some embodiments, the support structure 320 extends from the proximal surface 312 normal thereto, at a T-junction, so as to form a dual-sided shelf 324 extending from the base mount body 310. The dual-sided shelf 324 has opposing platform surfaces 326 that are each parallel to the common axis A and perpendicular to the magnet face 321.

In operation, when the support structure 320 is magnetically engaged with the drum hoop one of the platform surfaces 326 can be positioned to rest on a lip of the drum hoop. In this manner, the platform surfaces 326 function to stabilize the base mount 300 when engaged with the drum hoop. FIGS. 9A-9D illustrate the support structure 320 resting on the lip of the drum hoop, in accordance with at least one embodiment.

In some embodiments, the dual-sided shelf 324 is modularly formed as a series of blocks **324*a* with intervening one or more recesses 328 formed therebetween. One or more of the blocks 324*a* may house any number of magnets 322. However, preferably, each block 324*a* houses exactly one magnet 322. In this sense, each block 324*a* may be functionally viewed as its own dual-sided shelf 324. Accordingly, each block 324*a* may have its own platform surfaces 326*a***.

The recesses 328 are generally configured to receive the tension rod and/or the tension clamp of the drum 20 therein. Accordingly, in operation, when the support structure 320 is magnetically engaged with the drum hoop the tension rod and/or tension clamp can be positioned within the recess 328 between the blocks **324*a*. This allows for the magnets 322 within the blocks 324*a* to magnetically engage with the drum hoop without interference from the tension rod and/or tension clamp, so as to magnetically secure the base mount 300 to the drum 20. In some embodiments, the support structure 320** may be magnetically engaged with a claw of the tension rod and/or tension clamp that is in turn engaged with the drum hoop. Accordingly, the magnetic engagement is substantially in the direction of the common axis A.

In some embodiments, the audio system assembly further comprises: a rotation coupler 400. The rotation coupler 400 is generally configured to couple the housing 200 to the base mount 300 such that the angular orientation α of the housing 200 with respect to the base mount 300 is adjustable via rotation about the common axis A.

The rotation coupler 400 includes a rotation coupler body 410 that is fixed to the housing 200 via one or more fasteners 402, and is fixed to the base mount body 310 via a rotational adjustment fastener 404. In operation, the tightening of the rotational adjustment fastener 404 causes the rotation coupler body 410 to frictionally engage the main body at the angular orientation α, whereas the loosening of the rotational adjustment fastener 404 lessens such frictional engagement and allows the rotational adjustment about the common axis A.

In some embodiments, the rotation coupler body 410 is generally tab-shaped. For example, the rotation coupler body 410 shown in FIGS. 1-2 is generally shaped as a U-shaped prism juxtaposed with a cylindrical prism.

In some embodiments, the rotation coupler body 410 comprises the offshoot outlet 222*b* and at least a portion of the offshoot. In such embodiments, the housing 200 includes the port 220 and the port inlet, but the rotation coupler body 410 includes the offshoot outlet 222*b*. The housing 200 may or may not include its own outlet (e.g., the inline outlet) in addition to the offshoot outlet 222*b* of the rotation coupler body 410.

Figure 3A:
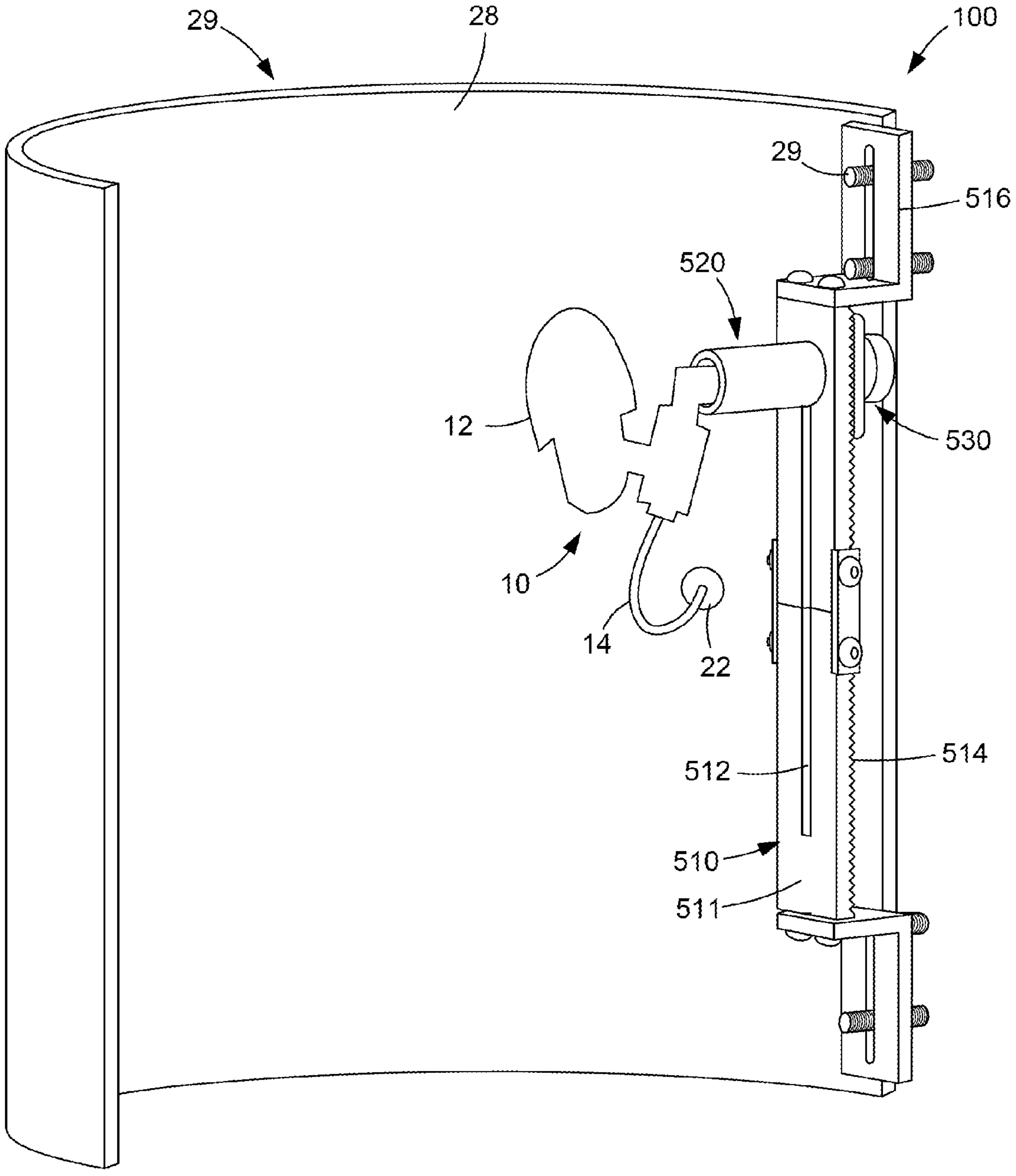
FIG. 3A is a cut-away perspective view of aspects of the exemplary audio accessory system in accordance with at least one embodiment.
Figure 3B:
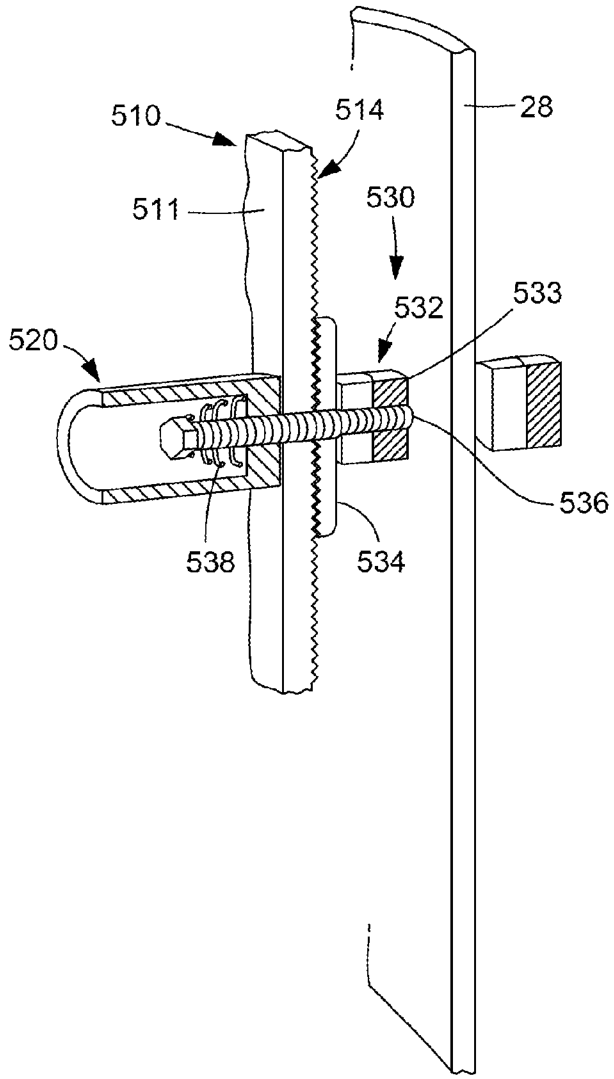
FIG. 3B is a cut-away perspective view of aspects of the exemplary audio accessory system in accordance with at least one embodiment.
Figure 4:
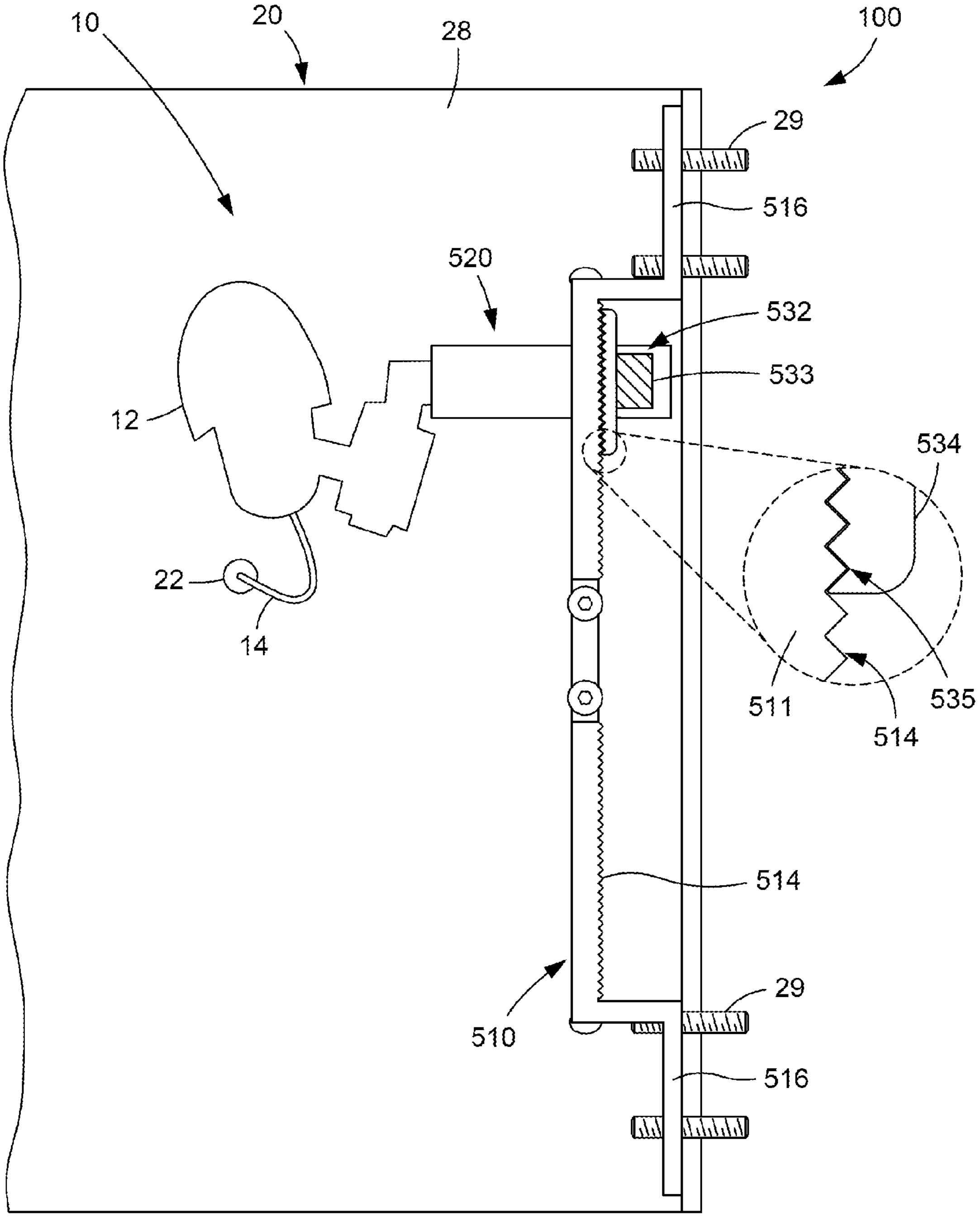
FIG. 4 is a cut-away side view of aspects of the exemplary audio accessory system in accordance with at least one embodiment.
Figure 5A:
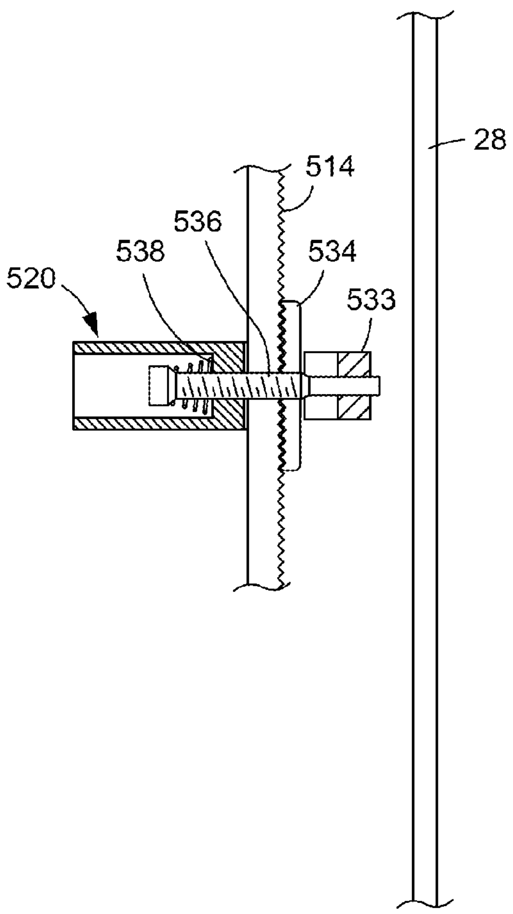
FIG. 5A is a cut-away side view of aspects of the exemplary audio accessory system in accordance with at least one embodiment.
Figure 5B:
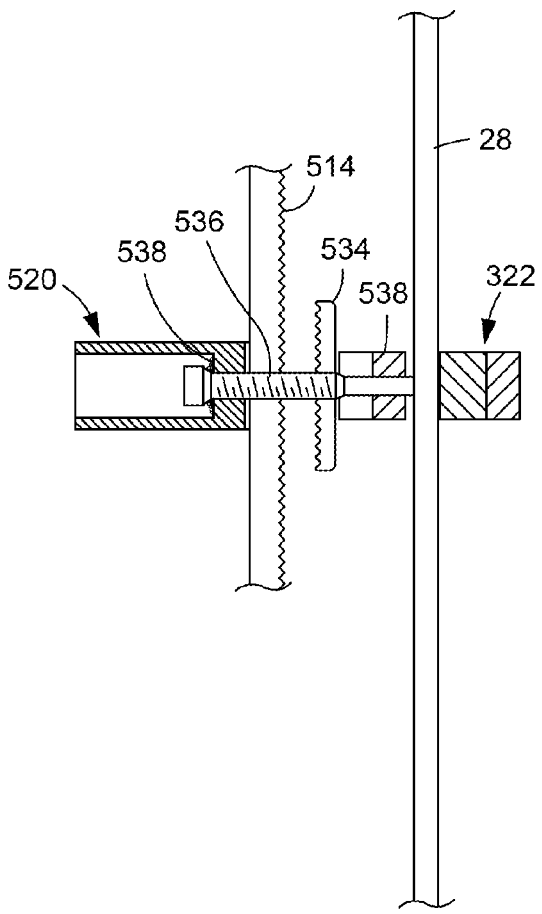
FIG. 5B is a cut-away perspective view of aspects of the exemplary audio accessory system in accordance with at least one embodiment.
Figure 6:
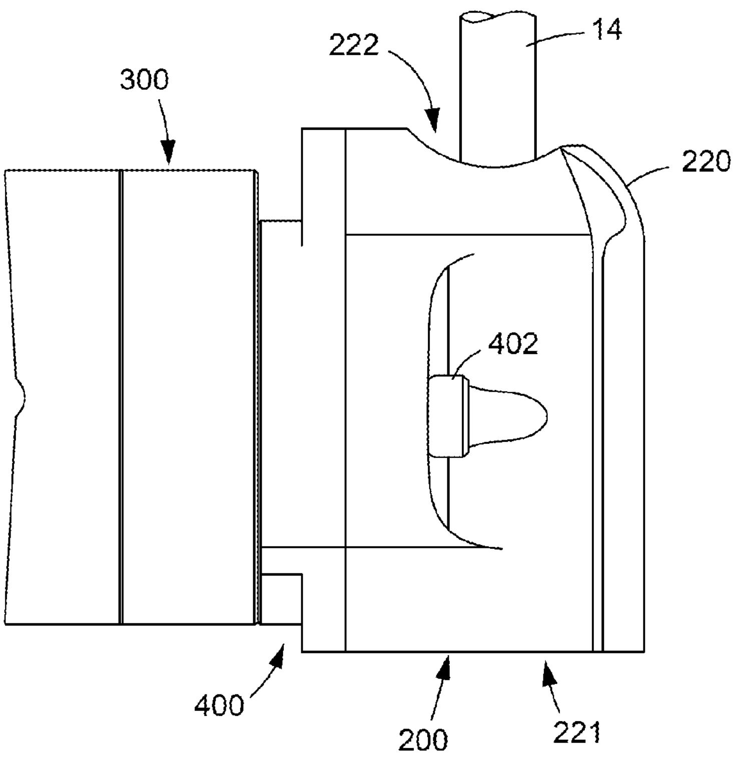
FIG. 6 is a side view of aspects of the exemplary audio accessory system in accordance with at least one embodiment.
Figure 7:
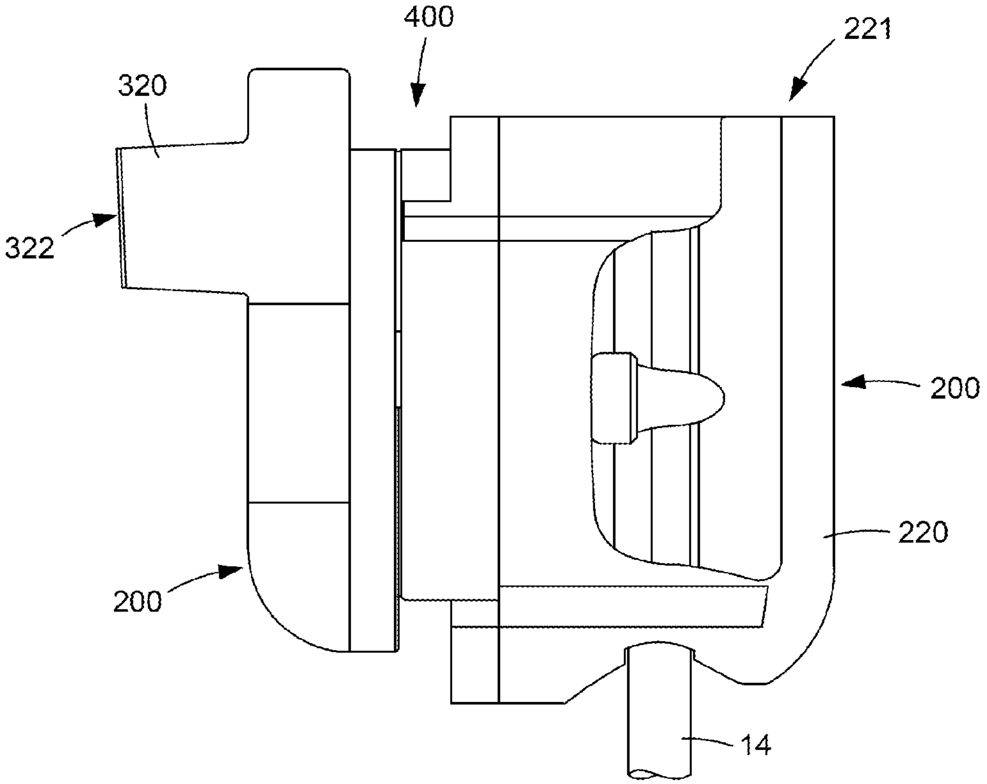
FIG. 7 is a side view of aspects of the exemplary audio accessory system in accordance with at least one embodiment.
Figure 8:
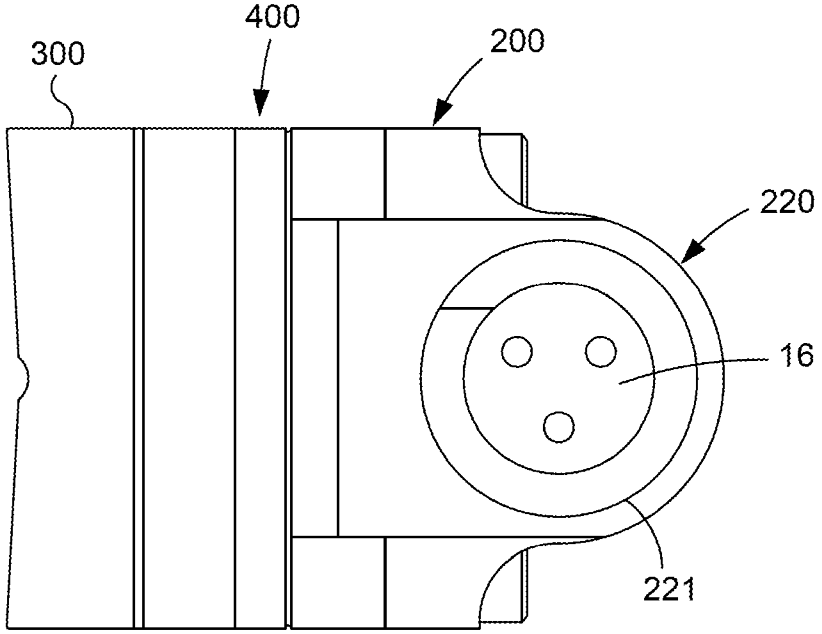
FIG. 8 is a side view of aspects of the exemplary audio accessory system in accordance with at least one embodiment.
Figure 9A:
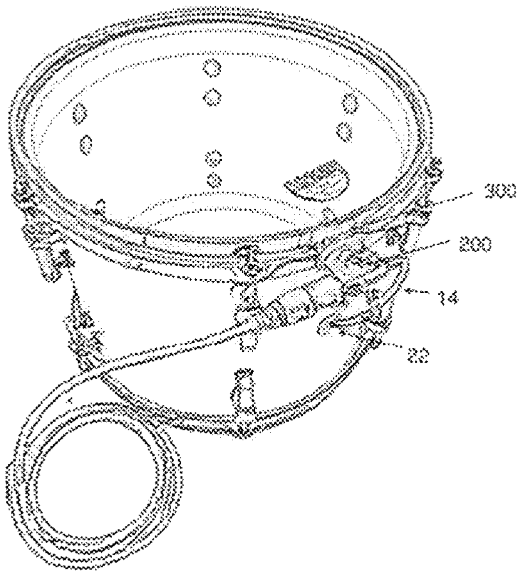
FIGS. 9A-9D are perspective views of aspects of the exemplary audio accessory system in accordance with at least one embodiment.
Figure 9B:
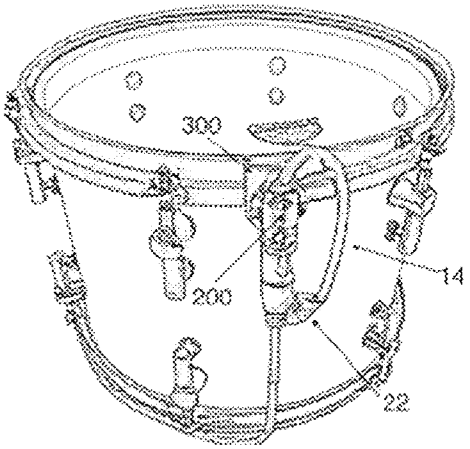
Figure 9C:
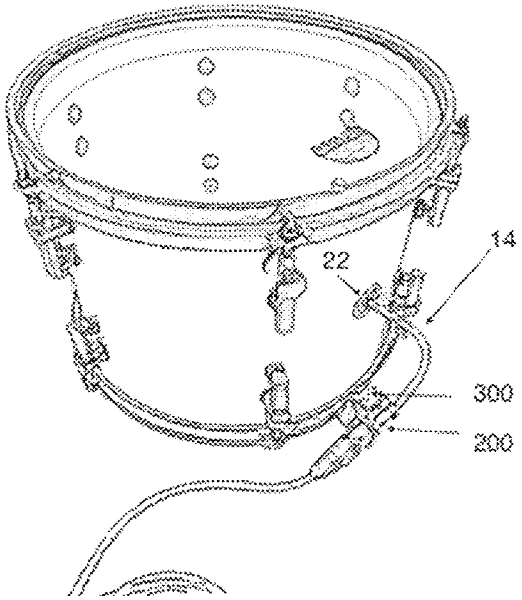
Figure 9D:
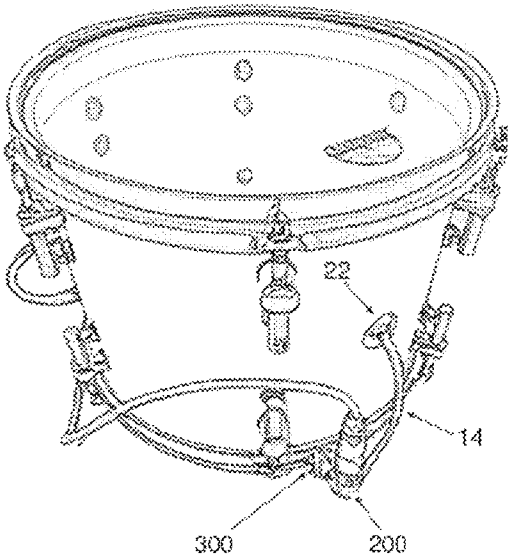

As shown in FIGS. 3-4, in some embodiments, the audio accessory system 100 further comprises: a position track 510, a microphone mount 520, and a repositioning mechanism 530.

The microphone mount 520 is generally configured to securely engage the microphone 12 for use. The microphone mount 520 is also generally configured such that it is repositionable along the position track 510.

The position track 510 is generally configured such that the microphone mount 520 is repositionable along the position track 510.

In some embodiments, the position track 510 comprises a track body 511 having a longitudinal slot 512 therein. The longitudinal slot 512 extends in the longitudinal direction of the track body 511, as well as completely through the track body 511.

In some embodiments, the position track 510 also includes a ribbed surface 514. The ribbed surface 514 is generally configured to frictionally engage an opposing ribbed surface that is pressed against it, so as to maintain relative positioning. Accordingly, the ribbed surface 514 generally comprises a series of laterally oriented spaced apart ribs, which may be, for example, triangular-prism shaped, rectangular-prism shaped, semi-circular prism shaped, or the like.

The position track 510 is generally mounted to a drum shell 28 of the drum 20 and spaced apart therefrom.

In some embodiments, the position track 510 includes one or more mounting brackets 516 configured to mount the position track 510 to the drum shell 28 so as to be spaced apart from the drum shell 28. In some embodiments, the mounting brackets 516 mount the position track 510 at one or more lug fasteners 29 of the drum 20.

The repositioning mechanism 530 is generally configured to reposition the microphone mount 520 along the position track 510.

In some embodiments, the repositioning mechanism 530 generally comprises: a magnetic release 532 fixed to a clamp plate 534, and an engagement bolt 536 that couples the microphone mount 520 to the magnetic release 532 and/or the clamp plate 534 through the longitudinal slot 512.

The clamp plate 534 includes a ribbed face 535 corresponding to the ribbed surface 514 of the position track 510, such that the ribbed face 535 is configured to frictionally engage the ribbed surface 514 when pressed against the ribbed surface 514, so as to thereby maintain the relative positioning of the clamp plate 534 with respect to the position track 510.

The magnetic release 532 includes a release magnet 533 coupled to the clamp plate 534 opposite the ribbed face 535 of the clamp plate 534. In some embodiments, the release magnet 533 is integrally joined to the toothed clamp plate 534.

The release magnet 533 is configured to magnetically couple with the at least one magnet 322 through the drum shell 28, so as to thereby cause the ribbed face 535 of the clamp plate 534 to disengage from the ribbed surface 514 of the position track 510. In other words, such magnetic coupling with the at least one magnet 322 pulls the clamp plate 534 from the ribbed surface 514 in a manner that disengages the ribbed face 535 from the ribbed surface 514.

Moreover, since the engagement bolt 536 couples the microphone mount 520 to the release magnet 533 and/or the clamp plate 534 through the longitudinal slot 512, the disengagement of the clamp plate 534 from the ribbed surface 514 of the position track 510 allows for the repositioning mechanism 530 and the microphone mount 520 to be repositioned along the position track 510 via the longitudinal slot 512. In some embodiments, the magnetic coupling of the release magnet 533 with the at least one magnet 322 through the drum shell 28 is sufficiently strong that vertical displacement of the at least one magnet 322 likewise displaces the repositioning mechanism 530/microphone mount 520 along the position track 510 via the longitudinal slot 512.

In some embodiments, the repositioning mechanism 530 includes a return mechanism 538. The return mechanism 538 is generally configured to cause the clamp plate 534 to frictionally engage the ribbed surface 514 in the absence of the magnetic coupling of the release magnet 533 with the at least one magnet 322. In other words, when the at least one magnet 322 is magnetically decoupled from the release magnet 533 (e.g., by moving the at least one magnet 322 sufficiently far away), the return mechanism 538 acts to return the clamp plate 534 to frictionally engage the ribbed surface 514. The relative position of the clamp plate 534 with respect to the position track 510 is thereby set, via the return mechanism 538, by the decoupling of the release magnet 533 with the at least one magnet 322.

In some embodiments, the return mechanism 538 comprises a return spring that spring-biases the engagement bolt 536 opposite the magnetic release 532. In other words, the return spring spring-biases the engagement bolt 536 to pull the clamp plate 534 towards the ribbed surface 514. The spring bolt is preferably housed within the microphone mount 520.

In some embodiments, the position track 510 is mounted to the drum shell 28 so as to be spaced apart from the drum shell 28 sufficient for the release magnet 533 and the clamped plate to be positioned within the space.

Other features and details are readily apparent from the figures, and are not discussed in-depth herein for the sake of efficiency. However, all features, structures and operations thereof that would be apparent from this disclosure to one of ordinary skill in the art are expressly contemplated.

The objects, advantages and features described in detail above are considered novel over the prior art of record and are considered critical to the operation of at least one embodiment of the present invention and to the achievement of at least one objective of the present invention. The words used in this specification to describe these objects, advantages and features are to be understood not only in the sense of their commonly defined meanings, but also to include any special definition with regard to structure, material or acts that would be understood by one of ordinary skilled in the art to apply in the context of the entire disclosure.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C. An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

Moreover, the definitions of the words or drawing elements described herein are meant to include not only the combination of elements which are literally set forth, but all equivalent structures, materials or acts for performing substantially the same function in substantially the same way to obtain substantially the same result. In this sense, it is therefore contemplated that an equivalent substitution of two or more elements may be made for any one of the elements described and its various embodiments or that a single element may be substituted for two or more elements in a claim without departing from the scope of the present invention.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted in conjunction with the appended claims.

What is claimed is:

1. An audio accessory system, comprising:

a housing configured to be mounted external to a drum and to hold a microphone cord therein, wherein the microphone cord extends from a microphone internal to the drum to the housing through an air hole of the drum; and a base mount configured to mount the housing external to the drum such that an angular orientation of the housing with respect to the base mount is adjustable via rotation of the housing about a common axis with the base mount, wherein the base mount includes a support structure having at least one magnet configured to magnetically engage the drum so as to removably secure the base mount to the drum.

2. The audio system accessory of claim 1, wherein the support structure comprises a magnet-block that houses the at least one magnet, wherein the at least one magnet is configured to magnetically engage one or more of:

a drum hoop of the drum; and a tension rod and/or a tension clamp of the drum.

3. The audio system accessory of claim 2, wherein the magnet block comprises a platform surface that is substantially parallel to the common axis and is configured to rest on the drum hoop when the support structure is magnetically engaged with the drum.

4. The audio system accessory of claim 2, wherein the magnet-block comprises a recess configured to receive the tension rod and/or a tension clamp when the support structure is magnetically engaged with the drum.

5. The audio system accessory of claim 1, wherein the magnetic engagement is substantially in the direction of the common axis.

6. The audio system accessory of claim 1, wherein the housing includes a port configured to hold a connection head of the microphone cord oriented normal to the common axis such that the connection head is accessible by a user to connect an XLR connector to the connection head.

7. The audio system accessory of claim 6, wherein the port comprises an outlet through which the microphone cord exits the housing.

8. The audio system accessory of claim 7, wherein the outlet is configured such that the audio cable exits the housing substantially in-line with the connection head.

9. The audio system accessory of claim 7, wherein the outlet is configured such that the audio cable exits the housing substantially askew of the connection head.

10. The audio system accessory of claim 1, further comprising:

a rotation coupler configured to couple the housing to the base mount such that the angular orientation of the housing with respect to the base mount is adjustable via rotation about the common axis, wherein the rotation coupler includes a rotational adjustment fastener configured to set the angular orientation.

11. The audio system accessory of claim 1, further comprising:

a position track mounted internal to drum, wherein the position track has a longitudinal slot and at least one ribbed surface;

a microphone mount configured to secure the microphone to the positioning track opposite the ribbed surface; and repositioning mechanism, comprising:

a release magnet joined to a ribbed clamp plate facing the ribbed surface of the position track, and an engagement bolt that couples the microphone mount to the magnetic release and/or the clamp plate through the longitudinal slot, wherein the release magnet is configured to magnetically couple with the at least one magnet through the drum, so as to thereby cause the ribbed clamp plate to disengage from the ribbed surface such that the microphone mount is repositionable along the longitudinal slot via the engagement bolt.

12. The audio system accessory of claim 11, wherein the release magnet is integrally joined to the ribbed clamp plate.

13. The audio system accessory of claim 11, further comprising:

a return mechanism configured to cause the ribbed clamp plate to engage the ribbed surface in the absence of the magnetic coupling of the release magnet with the at least one magnet.

14. The audio system accessory of claim 13, wherein the return mechanism comprises a return spring that spring-biases the engagement bolt opposite the release magnet.

15. The audio system accessory of claim 11, wherein the positioning track is spaced internal from the drum shell such that the magnetic release and the ribbed clamped plate are positioned within the space.

16. The audio system accessory of claim 11, wherein the positioning track is mounted to the drum shell at one or more lug fasteners of the drum.

* * * * *